(12) United States Patent
van Abeelen et al.

(10) Patent No.: US 6,499,657 B1
(45) Date of Patent: Dec. 31, 2002

(54) METHOD, SYSTEM AND STORAGE MEDIUM FOR ANALYZING PRODUCT DELIVERY

(75) Inventors: Petrus Cornelius A. M. van Abeelen, Westport, CT (US); James Peterson, Monroe, CT (US); John H. Drake, Latham, NY (US); Peter R. Walker, Fairfield, CT (US); Calman J. Ambrosy, III, Clifton Park, NY (US)

(73) Assignee: General Electric Company, Pittsfield, MA (US)

( * ) Notice: Subject to any disclaimer, the term of this patent is extended or adjusted under 35 U.S.C. 154(b) by 171 days.

(21) Appl. No.: 09/641,354

(22) Filed: Aug. 17, 2000

Related U.S. Application Data

(60) Provisional application No. 60/199,037, filed on Apr. 21, 2000.

(51) Int. Cl.[7] .................................................. G06R 17/00
(52) U.S. Cl. ...................................... 235/375; 235/385
(58) Field of Search ................................. 235/375, 385; 705/28

(56) References Cited

U.S. PATENT DOCUMENTS

| | | |
|---|---|---|
| 5,295,066 A | 3/1994 | Aoki |
| 5,809,479 A | 9/1998 | Martin et al. |
| 5,960,408 A | 9/1999 | Martin et al. |
| 6,029,140 A | 2/2000 | Martin et al. |
| 6,055,519 A | 4/2000 | Kennedy et al. |
| 6,073,114 A | 6/2000 | Perkins, III et al. |
| 6,094,642 A | 7/2000 | Stephenson et al. |
| 6,182,053 B1 * | 1/2001 | Rauber et al. .............. 235/375 |

* cited by examiner

Primary Examiner—Harold I. Pitts

(57) ABSTRACT

An exemplary embodiment of the invention is a method for analyzing product delivery to customers. The method includes generating a first level product classification corresponding to a number of products and determining delivery data for the first level product classification. The delivery data includes a span value indicative of delivery error for products in the first level product classification. The first level product classification is divided into at least two, second level product classifications. Each second level product classification corresponds to a subset of the first level product classification. Delivery data is determined for each of the second level product classifications. The delivery data includes a span value indicative of delivery error for products in the second level product classifications. Other embodiments of the invention include a system and storage medium for implementing the method.

21 Claims, 3 Drawing Sheets

METHOD, SYSTEM AND STORAGE MEDIUM FOR ANALYZING PRODUCT DELIVERY

CROSS REFERENCE TO RELATED APPLICATIONS

This application claims the benefit of U.S. provisional patent application Ser. No. 60/199,037 filed Apr. 21, 2000, the entire contents of which are incorporated herein by reference.

BACKGROUND OF THE INVENTION

The invention relates to product delivery and in particular to a method, system and storage medium for analyzing product delivery and determining the source of product delivery delay. In today's business world, customer satisfaction is crucial to the success of any enterprise. A key source of customer dissatisfaction is errors in delivering products to the customer. Often a customer requires a product delivered on a requested date and often at a requested time. The ability to meet this requested delivery date is important in maintaining customer satisfaction. Products arriving at the customer prior to the requested delivery date can result in storage problems for the customer who lacks space to store the product. Products arriving at the customer after the requested delivery date can cause delays in the customer's business. Accordingly, meeting the requested delivery date is crucial to maintaining customer satisfaction.

Sales over the Internet have also forced product providers to meet increasingly higher demands from consumers. Such high volume purchasing can overwhelm product suppliers. For example, in December 1999, Toys R Us notified shoppers of toysrus.com that holiday gifts would not be delivered to the customer until after Dec. 25, 1999. With on-line shopping services becoming increasingly available, customers can easily direct their business to competitors when requested delivery dates are not met. These demands on product providers to deliver products to customers on the requested delivery date have caused product suppliers to focus on improving product delivery.

One difficulty in improving product delivery is determining which products over a range of products are creating delivery errors. Reducing delivery errors, however, requires time and resources of the product supplier. Spending such resources across an entire product line may product little or no improvement. Thus, there is a need for a system of determining the source and magnitude of delivery errors so that resources can be directed to the products having the highest delivery error.

BRIEF SUMMARY OF THE INVENTION

An exemplary embodiment of the invention is a method for analyzing product delivery to customers. The method includes generating a first level product classification corresponding to a number of products and determining delivery data for the first level product classification. The delivery data includes a span value indicative of delivery error for products in the first level product classification. The first level product classification is divided into at least two, second level product classifications. Each second level product classification corresponds to a subset of the first level product classification. Delivery data is determined for each of the second level product classifications. The delivery data includes a span value indicative of delivery error for products in the second level product classifications. Other embodiments of the invention include a system and storage medium for implementing the method.

DETAILED DESCRIPTION OF THE INVENTION

Figure 1:
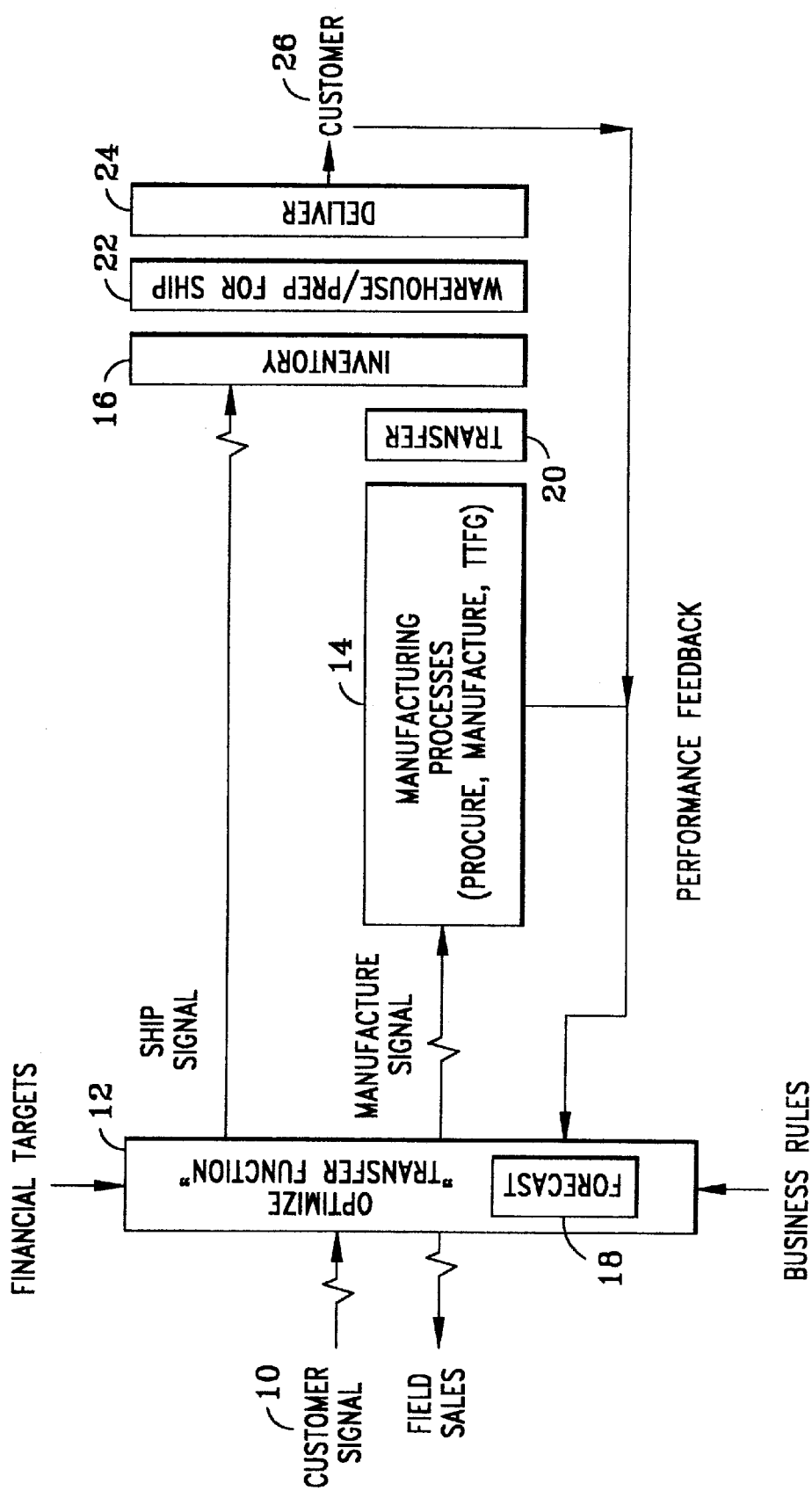
FIG. 1 is a simplified block diagram of a product delivery process.

The invention is related to a method, system and storage medium for analyzing an improving product delivery. FIG. 1 is a simplified block diagram of an exemplary product delivery process. A customer signal 10 indicating a desire for a product is processed by an optimization process 12. The optimization process can initiate manufacture of a product if the product is not currently in inventory by submitting a manufacturing signal to a manufacturing process 14. If the ordered product is available, the optimization process 12 initiates transferring the product from an inventory process 16 by sending a ship signal to inventory process 16. The optimization process 12 also receives business rules and financial targets and can initiate manufacturing or shipping in response to these inputs. In addition, the optimization process includes a forecast module 18 which can initiate manufacturing based on predicted demand for a product.

From the manufacturing process 14, a transfer process 20 transports products from the manufacturing process to inventory process 16. This may include physically moving the products from a manufacturing location to an inventory location and recording receipt of the products in the inventory location. From the inventory process 16, the product is prepared for shipment through a warehouse/preparation for shipment process 22. This may include removing assorted products from inventory, packaging the products, labeling the products for delivery, etc. Finally, a delivery process 24 transports the products to a customer 26. The delivery process may include transportation of the product to the customer through a carrier. The customer can provide feedback which affects the optimization process 12 and the manufacturing process 14.

The customer signal 10 typically will include a requested delivery date for the product. As is well known in the art, the process of providing a product to a customer on a requested delivery date can be formidable task. The present invention provides a method and system for analyzing product delivery data in order to identify product classifications causing delivery errors.

Figure 2:
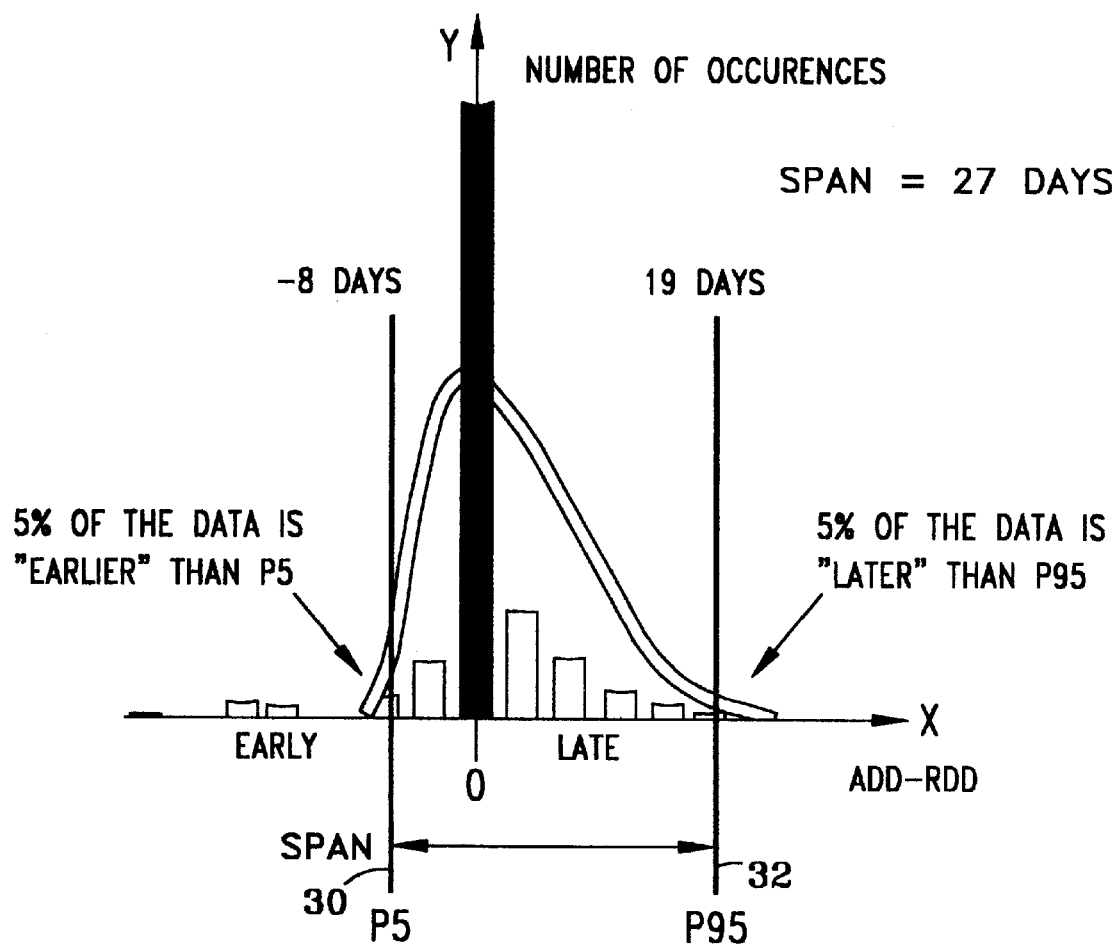
FIG. 2 is a histogram of delivery errors.

FIG. 2 is a plot of product delivery data shown in histogram form. The x-axis represents actual delivery date (ADD) minus requested delivery date (RDD). The term date is intended to have a broad meaning and may be measured in days, hours and/or minutes depending on the level of specificity desired. This difference can be considered the delivery error. Ideally, the delivery error should be zero for all shipments. The y-axis represents the number of occurrences for each delivery error. From the data in FIG. 2, a span value can be determined which represents how effectively the requested delivery date is being met. The span value is equal to the time from the earliest shipment (largest negative delivery error) to the latest shipment (largest positive delivery error). The delivery error data may be limited to prevent isolated incidents (e.g., outlier data) from corrupting the span value. As shown in FIG. 2, the delivery error data may be limited by a lower limit 30 and upper limit 32. In the example shown in FIG. 2, the lower limit is the $5^{th}$ percentile of the delivery error data and the upper limit is the $95^{th}$ percentile of the delivery error data. It is understood that different limits (e.g., $2^{nd}$ percentile to $98^{th}$ percentile) may be used or no limits may be imposed on the delivery error data. To determine the span value, the time between the earliest shipment and the latest shipment is determined and used as the span value. In the example shown in FIG. 2, the earliest shipment (without viewing data below the $5^{th}$ percentile) was eight days early. The latest shipment (without viewing data above the $95^{th}$ percentile) was nineteen days late. This results in a span value of twenty seven days. Although the delivery error data is shown in terms of days, it is understood that any time scale may be used.

In addition to using the span value to evaluate product delivery, the median of the delivery error data is also an indication of product delivery effectiveness. Ideally, the $50^{th}$ percentile or the median corresponds to a delivery error of zero. Given the variance in the delivery error data, common statistical measurements such as mean and standard deviation are not effective in measuring product delivery. Due to this variance, the invention uses span and median as measures of product delivery.

As described herein, reducing span values requires resources of the product supplier such as time, money, etc. It is beneficial to focus these resources on one or more categories of products that contribute most to the span value. One embodiment of the invention is a method for classifying products and determining a span value for each classification to identify where span values are high.

Figure 3:
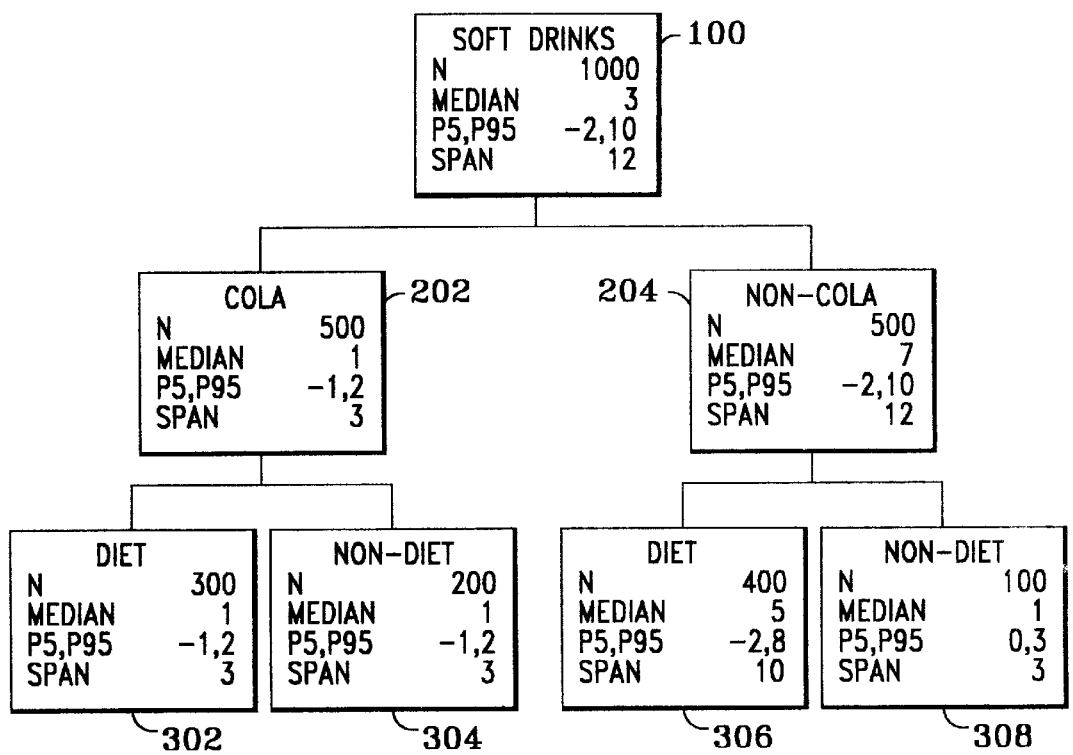
FIG. 3 depicts an exemplary stratification of product orders.

In order to determine product classifications and the associated span values, a process referred to as stratification is performed. FIG. 3 depicts an exemplary stratification for a class of products. At the first level, a high level or generic classification of products is provided along with product delivery data including the number of products N in the classification, the median delivery error, the delivery error at the lower and upper limits and the span value. FIG. 3 depicts a first level classification 100 including delivery data for a class of goods such as soft drinks. The first level classification 100 is then divided into at least two second level classifications 202 and 204. The second level classifications are subsets of the first level classification. As shown in FIG. 3, the second level classification divides the first level classification into two subsets, cola and non-cola soft drinks. The delivery data for each second level classification is determined. From the second level classification, it becomes apparent that a major contributor to the delivery error in the first classification level is the non-cola soft drinks which have a span value of 12, significantly higher than the span value of 3 for cola soft drinks.

Each second level classification can be broken down into at least two third level classifications 302, 304, 306 and 308 as shown in FIG. 3. The third level classifications are subsets of the second level classifications. In an exemplary embodiment, the third level classifications are the same for each second level classification. For example, both the cola and non-cola second level classifications are divided into diet and non-diet third level classifications. The third level classifications may also vary for each second level classification. The stratification process can continue for N levels.

As shown in FIG. 3, the third level classification 306 has a span value higher than the other classifications. This indicates that the third level classification 306 (i.e., non-cola, diet) is the leading contributor to the span value at the first level. Accordingly, the supplier of the soft drinks can focus resources on improving the delivery error for the non-cola, diet soft drinks. The supplier may be any entity in the supply chain including manufacturer, distributor, retailer, etc. Each entity may perform different corrective action (e.g., improve manufacturing, improve order forecasting, improve shipping, etc.) to improve the span value.

In an exemplary embodiment of the invention, the stratification process shown in FIG. 3 is used by a manufacturer of plastics to improve product delivery. In this embodiment, a number of stratification factors are used to generate the classification levels. Such stratification factors include customer factors, product factors, order factors, order management factors, scheduling/manufacturing factors and distribution factors. Customer factors are directed to the customer ordering the product and include factors such as country of order, whether the customer is on credit hold at the time of order, customer size, whether the customer is a new customer and payment terms. For example, stratification based on whether the customer is new may reveal that new customers have higher delivery errors than existing customers.

Product factors include whether the product is made to order (MTO), whether the product is made to stock (MTS), the product group, whether the product is a new product, the product itself, the number of levels on the product bill of materials and the industry the product is directed to (e.g., commercial, residential, etc.).

Order factors relate to the nature of the product order and includes factors such as whether the customer requested shipment immediately (e.g., ASAP order), whether the requested delivery date matched the promised delivery date, whether the order was shipped complete, the time from the order date to the requested delivery date, the order size, the order timing in the quarter, the order timing in week and the number of order line items.

Order management factors include the sales territory, the customer service representative taking the order and whether the order is subject to a price hold (e.g., the order is on hold due to a dispute concerning the price) or credit hold.

Manufacturing factors include the machine the order was manufactured on, the inventory level in finished goods, the capacity utilization, the raw material used in making the order, whether a shutdown occurred, the production location, the scheduler responsible for scheduling the order, the packaging type for the order and the production cycle time.

Distribution factors include the distance from the shipping point to the delivery point, the carrier used, the location the order was shipped from, the shipping mode, the ship timing in the quarter and the ship timing in the week.

Determining how to determine product classifications is another aspect of the invention. To improve delivery errors, and thus the span value, it is helpful to determine a process that is negatively affecting span value. The distribution of a product involves numerous processes and thus detecting a single process that requires improvement can be difficult. To isolate a process, classification factors can be tested individually to detect which factors create large changes in median delivery error. For example, if products are classified by customer size and large customers have a −8 median delivery error and small customers have a +20 median delivery error, this suggests that a different process is used for large customer orders than used for small customer orders. To confirm this hypothesis, the large and small customer classifications can be further classified (i.e., second level classification) by a second factor, for example region. If the median delivery error remains substantially the same in the second level classification (i.e.,−8 for large customers and +20 for small customers) this indicates that a process exists for large and small customers. The small customer process can then be evaluated for improvements.

Figure 4:
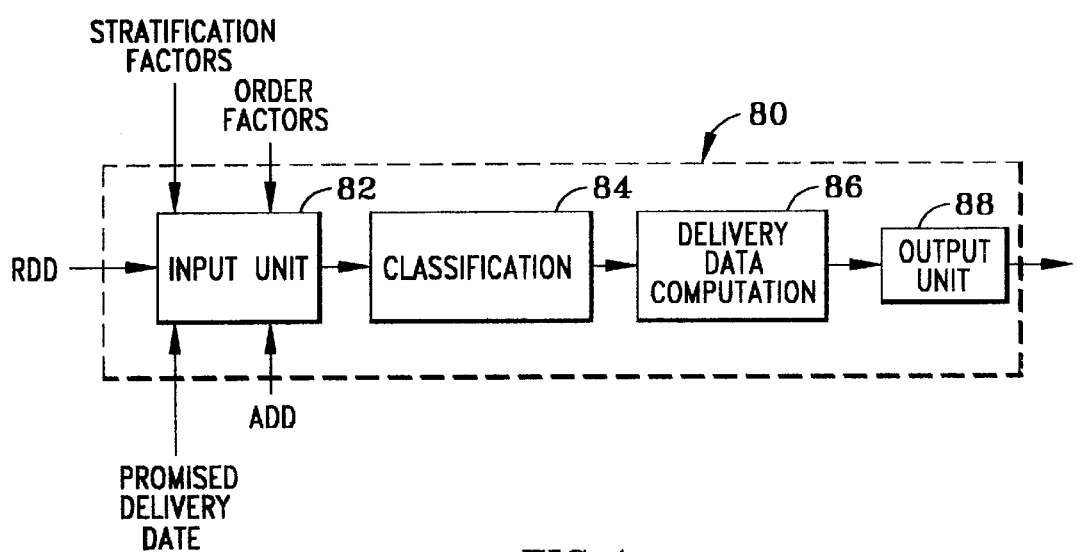
FIG. 4 is block diagram of an exemplary system for performing the stratification.

FIG. 4 is a diagram of an exemplary system 80 for performing the N-level classification and determining the delivery data shown in FIG. 2. The system 80 may be implemented using a general purpose computer executing a computer program stored in a storage medium. The system 80 includes an input unit 82 for receiving inputs including ADD, RDD, promised delivery date and order factors for numerous orders of products. Also input to system 80 are stratification factors defining the levels of the hierarchy shown in FIG. 3. The stratification factors define the classification levels. These stratification factors may be generated by a person requesting stratification. The order factors are used to group ordered products in the proper classification. The promised delivery date is the date the supplier indicated to the customer that the product would be delivered. Products can be classified based on whether or not the promised delivery date equals the requested delivery date. The input data may be entered directly in the system 80 through an input peripheral such as a keyboard in which case the input unit may be a port on a general purpose computer. The inputs to the input unit 82 may also be submitted remotely via phone lines and/or a network (e.g. intranet, LAN, WAN, Internet) in which case input unit 82 is a modem or a network card.

The data from input unit 82 is provided to a classification device 84 which assigns product orders to the classification levels based on the stratification factors. For example, if the stratification factor for the first level is "soft drink", the classification device 84 locates all orders having the order factor soft drinks and assigns these orders to the first level classification. The subsequent levels are formed in a similar manner. A delivery data A computation device 86 determines the number of orders in each classification and computes the median, the delivery error at the lower and upper limits and the span value for the orders in each classification. An output device 88 outputs the classifications and the delivery data in a format such as that shown in FIG. 3. The output device 88 may drive a display device (e.g., a CRT display, printer, etc.) connected to the system 80. Alternatively, the output device 88 may be communications device (e.g., modem, network card, etc.) for transmitting the output to a remote system via phone lines and/or a network.

The span value and the median described above have been related to delivery dates of products. That is, the span value described above is related to whether the actual delivery date meets that requested delivery date. The span value and median can be computed for any characteristic of a deliverable. A deliverable can be a product (such as a manufactured item) or a service (such as a loan). The computation of the span value can be based on any characteristic of the deliverable. In this generic description, a requested deliverable characteristic is compared to an actual deliverable characteristic. For example, a product may be evaluated based on characteristics such as delivery date, color, packaging, conformity to specifications, etc. A service such as a loan can be evaluated based on characteristics such as loan principal, interest rate, termination conditions, etc. The receiver of the deliverable has specified requested deliverable characteristics and the deliverable provided by a provider has actual deliverable characteristics. The difference between the actual deliverable characteristics and the requested deliverable characteristics is a characteristic error and can be plotted as shown in FIG. 2 and a span value and median can be obtained as described above with reference to FIG. 2. Accordingly, the invention is not limited to time based measurements such as delivery dates.

As described above, the present invention can be embodied in the form of computer implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for analyzing product delivery to customers, the method comprising:

generating a first level product classification corresponding to a number of products and determining delivery data for said first level product classification, said delivery data including a span value indicative of delivery error for products in said first level product classification;

dividing said first level product classification into at least two second level product classifications, each second level product classification corresponding to a subset of the first level product classification and determining delivery data for each of said second level product classifications, said delivery data including a span value indicative of delivery error for products in said second level product classifications.

2. The method of claim 1 further comprising:

dividing each of said second level product classifications into at least two third level product classifications, each third level product classification corresponding to a subset of one of the second level product classification and determining delivery data for each of said third level product classifications, said delivery data including a span value indicative of delivery error for products in said third level product classifications.

3. The method of claim 2 wherein:
said third level product classifications are the same for each of said second level product classifications.

4. The method of claim 1 wherein:
said span value is determined by:
receiving a requested delivery date from the customer;
delivering the product to the customer;
determining the actual delivery date of the product to the customer;
determining a difference between the actual delivery date and the requested delivery date, said difference representing delivery error;
obtaining a plurality of delivery errors based on a plurality of product orders;
determining a span value based on the difference between a minimum delivery error and a maximum delivery error.

5. The method of claim 4 further comprising:
limiting the delivery errors considered in determining the span value.

6. The method of claim 5 wherein:
said limiting includes applying an upper limit on the delivery errors.

7. The method of claim 6 wherein: said upper limit is the $95^{th}$ percentile of the delivery errors.

8. The method of claim 5 wherein:
said limiting includes applying a lower limit on the delivery errors.

9. The method of claim 8 wherein:
said lower limit is the $5^{th}$ percentile of the delivery errors.

10. The method of claim 1 wherein:
said product classifications are derived based on a plurality of stratification factors.

11. The method of claim 10 wherein:
said stratifications factors include customer factors indicative of the customer ordering the products.

12. The method of claim 10 wherein:
said stratifications factors include product factors indicative of the order products.

13. The method of claim 10 wherein:
said stratifications factors include order factors indicative of the product order.

14. The method of claim 10 wherein:
said stratifications factors include order management factors indicative of processing of product orders by the supplier.

15. The method of claim 10 wherein:
said stratifications factors include order factors indicative of the product order.

16. The method of claim 10 wherein:
said stratifications factors include manufacturing factors indicative of manufacturing of products.

17. The method of claim 10 wherein:
said stratifications factors include distribution factors indicative of delivery of products.

18. A method for analyzing conformity to requested characteristics of a deliverable provided from a provider to a receiver, the method comprising:
generating a first level deliverable classification corresponding to a number of deliverables and determining delivery data for said first level product classification, said delivery data including a span value indicative of conformity to requested characteristics in said first level deliverable classification;
dividing said first level deliverable classification into at least two second level deliverable classifications, each second level deliverable classification corresponding to a subset of the first level deliverable classification and determining delivery data for each of said second level deliverable classifications, said delivery data including a span value indicative of conformity to requested characteristics in said second level deliverable classifications.

19. A method for detecting a process affecting product delivery to customers, the method comprising:
generating a first level product classification corresponding to a number of products and determining delivery data for said first level product classification, said delivery data including a median delivery error for products in said first level product classification;
dividing said first level product classification into at least two second level product classifications, each second level product classification corresponding to a subset of the first level product classification and determining delivery data for each of said second level product classifications, said delivery data including a median delivery error for products in said second level product classifications;
assuming the existence of a process affecting median delivery error for products in said second level product classifications in response to a difference between median delivery error of said at least two second level product classifications; and
dividing each of said second level product classifications into at least two third level product classifications, each third level product classification corresponding to a subset of one of the second level product classification and determining delivery data for each of said third level product classifications, said delivery data including a median delivery error for products in said third level product classifications; and
confirming the existence of said process affecting median delivery error for products in said second level classification if said median delivery error for products in said third level product classifications are substantially equal to said median delivery error of respective second level product classifications.

20. A system for measuring product delivery to customer, the system comprising:
an input unit for receiving a requested delivery date, an actual delivery date, product order factors and stratification factors for a plurality of product shipments;
a classification device for receiving said stratification factors defining a plurality of product classifications and assigning products orders to at least one product classification based on said stratification factors and said product order factors; and
a delivery data computation device for determining a span value for each product classification, said span value indicative of delivery error for products in each product classification;
wherein said product classification includes a first level product classification corresponding to a number of products and at least two second level product classifications, each second level product classification corresponding to a subset of the first level product classification.

21. A storage medium encoded with machine-readable computer program code for analyzing product delivery to customers, the storage medium including instructions for causing a computer to implement a method comprising:

generating a first level product classification corresponding to a number of products and determining delivery data for said first level product classification, said delivery data including a span value indicative of delivery error for products in said first level product classification;

dividing said first level product classification into at least two second level product classifications, each second level product classification corresponding to a subset of the first level product classification and determining delivery data for each of said second level product classifications, said delivery data including a span value indicative of delivery error for products in said second level product classifications.

* * * * *